United States Patent
Erickson et al.

(10) Patent No.: US 6,913,427 B2
(45) Date of Patent: Jul. 5, 2005

(54) ADJUSTMENT DEVICE FOR SELF-COLLETING DRILL MOTORS

(75) Inventors: Robert A. Erickson, Raleigh, NC (US); Thomas O. Muller, Greensburg, PA (US); Michael A. Weisel, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 232 days.

(21) Appl. No.: 10/050,395

(22) Filed: Jan. 16, 2002

(65) Prior Publication Data

US 2003/0133764 A1 Jul. 17, 2003

(51) Int. Cl.[7] .............................................. B23B 45/14
(52) U.S. Cl. ........................................ 408/95; 408/110
(58) Field of Search ............................ 408/14, 95, 97, 408/98, 128, 110, 202, 241.5; 409/206, 210

(56) References Cited

U.S. PATENT DOCUMENTS

| | | | |
|---|---|---|---|
| 945,368 A | 1/1910 | Bocorselski | |
| 3,767,313 A | * 10/1973 | Bohoroquez et al. | 408/14 |
| 3,782,849 A | 1/1974 | Mizoguchi | 408/197 |
| 3,891,015 A | * 6/1975 | Calcagno | 144/136.2 |
| 4,063,843 A | 12/1977 | Barkley et al. | 408/146 |
| 4,557,646 A | 12/1985 | Biek | |
| 4,571,132 A | 2/1986 | Bunge | 409/234 |
| 4,578,004 A | * 3/1986 | Reil | 408/87 |
| 4,588,334 A | * 5/1986 | Khurana | 408/61 |
| 4,752,158 A | * 6/1988 | Riley | 408/14 |
| 4,764,060 A | * 8/1988 | Khurana | 408/14 |
| 4,813,822 A | * 3/1989 | Biek | 408/14 |
| 4,955,767 A | 9/1990 | Kaiser et al. | 408/146 |
| 5,040,932 A | 8/1991 | Oshnock | 409/234 |
| 5,054,968 A | * 10/1991 | Eckman | 408/97 |
| 5,746,552 A | * 5/1998 | Tsui et al. | 408/72 B |
| 5,853,271 A | 12/1998 | Schanz | 408/146 |
| 6,050,759 A | * 4/2000 | Bone | 409/182 |

FOREIGN PATENT DOCUMENTS

| | | |
|---|---|---|
| DE | 298 03 144 U | 4/1998 |
| FR | 2 806 650 A | 9/2001 |

OTHER PUBLICATIONS

European Patent Office Search Report, dated May 9, 2003, in European application No. 03000594.6.

* cited by examiner

Primary Examiner—Daniel W. Howell
(74) Attorney, Agent, or Firm—Larry R. Meenan

(57) ABSTRACT

An adjustment device comprises a first portion and a second portion. The first and second portions are adjustably engaging one another. The adjustment device has an overall length that is adapted to be adjusted by adjusting the first and second portions relative to one another. The overall length is adapted to be adjusted to vary a distance between the drill motor and the work piece. Another embodiment of the invention comprises a slip fit member and a threaded member opposite the slip fit member. The adjustment device has an overall length that is adjustable to vary a spatial relation between the drill motor and work piece. Yet another embodiment of the invention comprises a drill motor, a support, and an adjustment device. The adjustment device comprises a slip fit member and a threaded member spaced apart from the slip fit member. One of the members is engageable with the drill motor and the other member is engageable with the support. The adjustment device has an overall length that is adjustable to vary the spatial relation between the drill motor and the support.

13 Claims, 7 Drawing Sheets

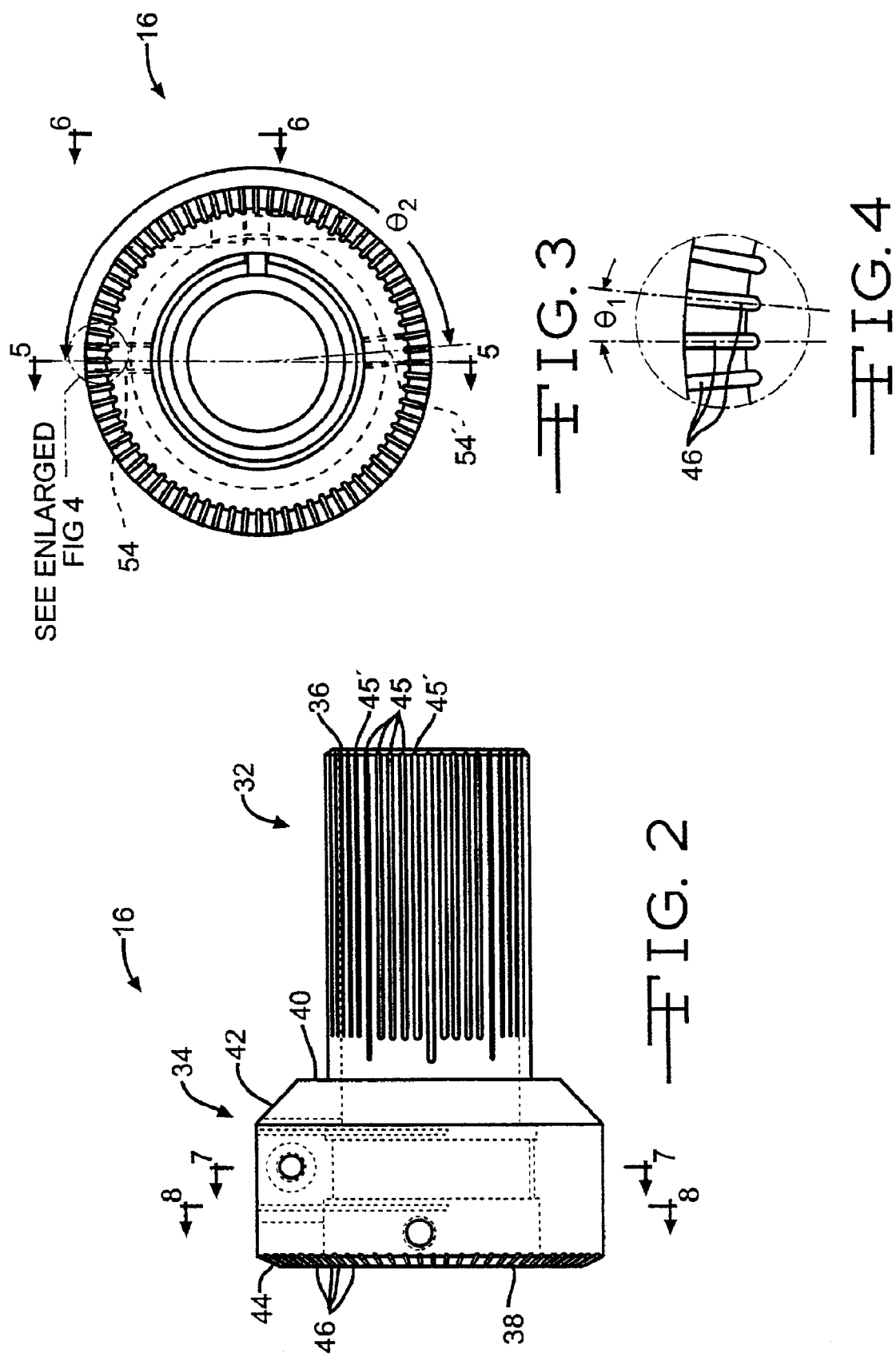

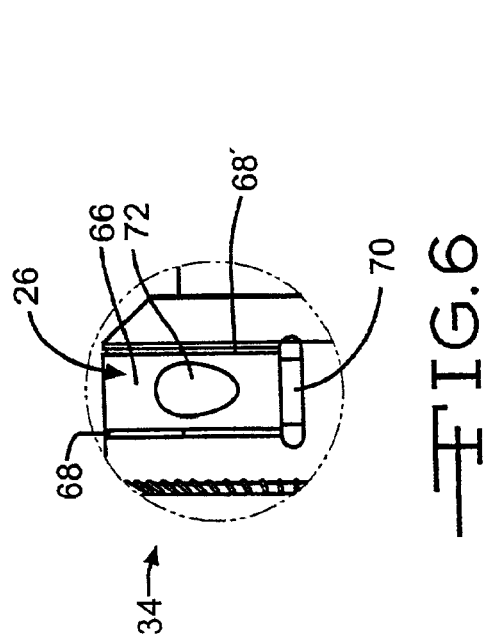
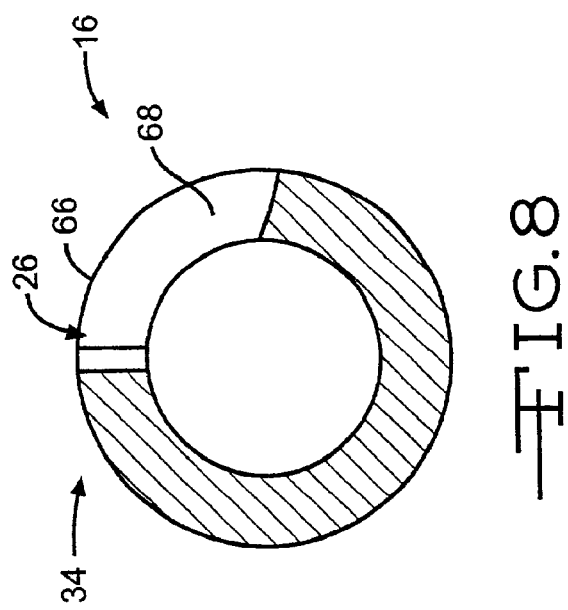
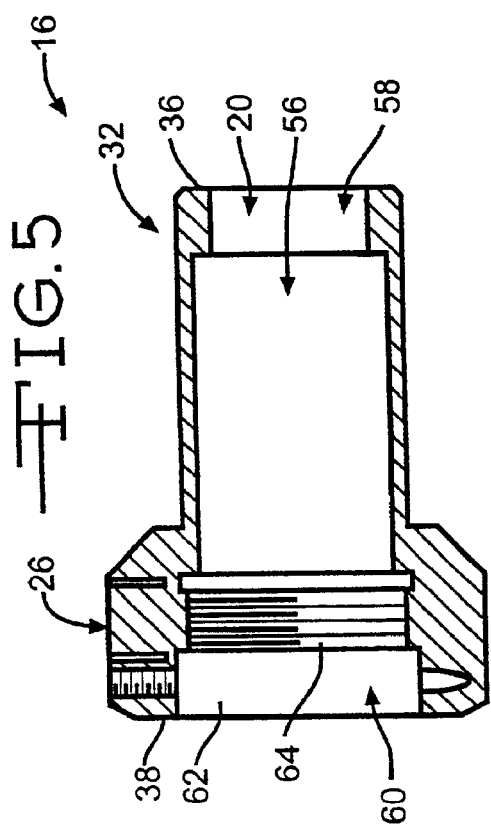
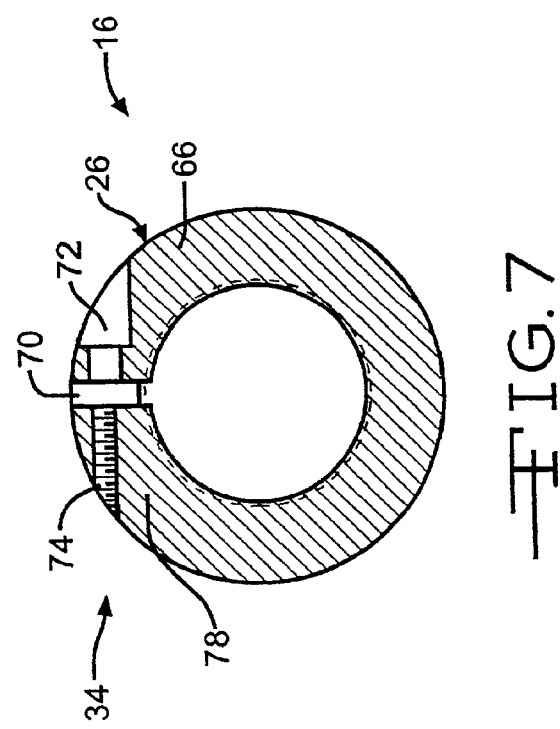

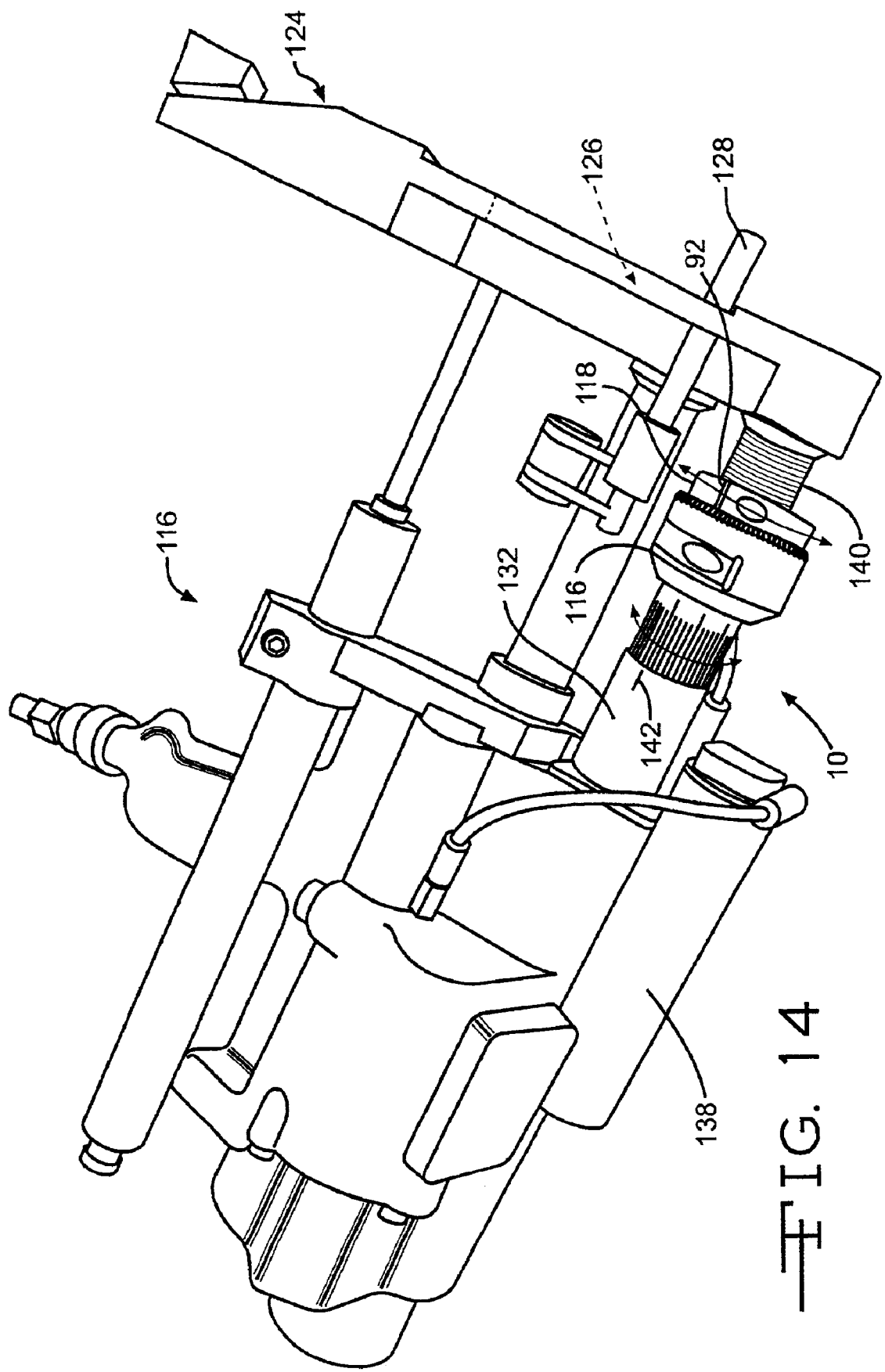

ADJUSTMENT DEVICE FOR SELF-COLLETING DRILL MOTORS

BACKGROUND OF THE INVENTION

1. Field of the Invention

This invention generally relates to self-colleting drill motor and, more specifically, to an adjustment device for self-colleting drill motors.

2. Description of the Related Art

Self-colleting drills are well known. It is also well known to provide adjustment devices for self-colleting machines. Such devices are adjustable to vary the distance between the drill motor and a work piece and consequently, the depth of holes produced by the drill motor. Known adjustment devices are deficient because they require numerous adjustments to enable a user to drill holes to a desired depth. Numerous adjustments are required because the accuracy of known devices is limited. This limited accuracy can introduce error in each adjustment. Consequently, subsequent adjustments may be required. As a result, known devices are inefficient, laborious, and tedious to use.

Clearly, there is a need for a low-cost, user friendly adjustment device that offers a high level of accuracy and thus is easy and efficient to use.

SUMMARY OF THE INVENTION

Generally speaking, the invention is drawn to an adjustment device that overcomes the aforementioned shortcomings associated with the prior art. To this end, the adjustment device of the invention comprises a first portion and a second portion. The first and second portions adjustably engage one another. The adjustment device has an overall length that is adapted to be adjusted by adjusting the first and second portions relative to one another. The overall length is adapted to be adjusted to vary a distance between the drill motor and the work piece.

Another embodiment of the invention comprises a slip fit member and a threaded member opposite the slip fit member. The adjustment device has an overall length that is adjustable to vary a spatial relation between the drill motor and work piece.

Yet another embodiment of the invention comprises a drill motor, a support, and an adjustment device. The adjustment device comprises a slip fit member and a threaded member spaced apart from the slip fit member. One of the members is engageable with the drill motor and the other member is engageable with the support. The adjustment device has an overall length that is adjustable to vary the spatial relation between the drill motor and the support.

BRIEF DESCRIPTION OF THE DRAWINGS

FIG. 2 is a reduced scale side elevational view of a fine adjustment sleeve of the adjustment device shown in FIG. 1;

FIG. 3 is an end view of the fine adjustment sleeve shown in FIG. 2;

FIG. 4 is an enlarged view of fine gradations carried by the fine adjustment sleeve shown in FIG. 3;

FIG. 5 is a sectional view of the fine adjustment sleeve taken along line 5—5 in FIG. 3;

FIG. 6 is an enlarged elevational view of a fine adjustment clamp taken along line 6—6 in FIG. 3;

FIG. 7 is a sectional view of an enlarged member of the fine adjustment sleeve taken along line 7—7 in FIG. 2;

FIG. 8 is a sectional view of the adjustment device taken along line 8—8 in FIG. 2;

FIG. 14 is an environmental perspective view of the adjustment system according to the invention.

DETAILED DESCRIPTION OF THE INVENTION

Figure 1:
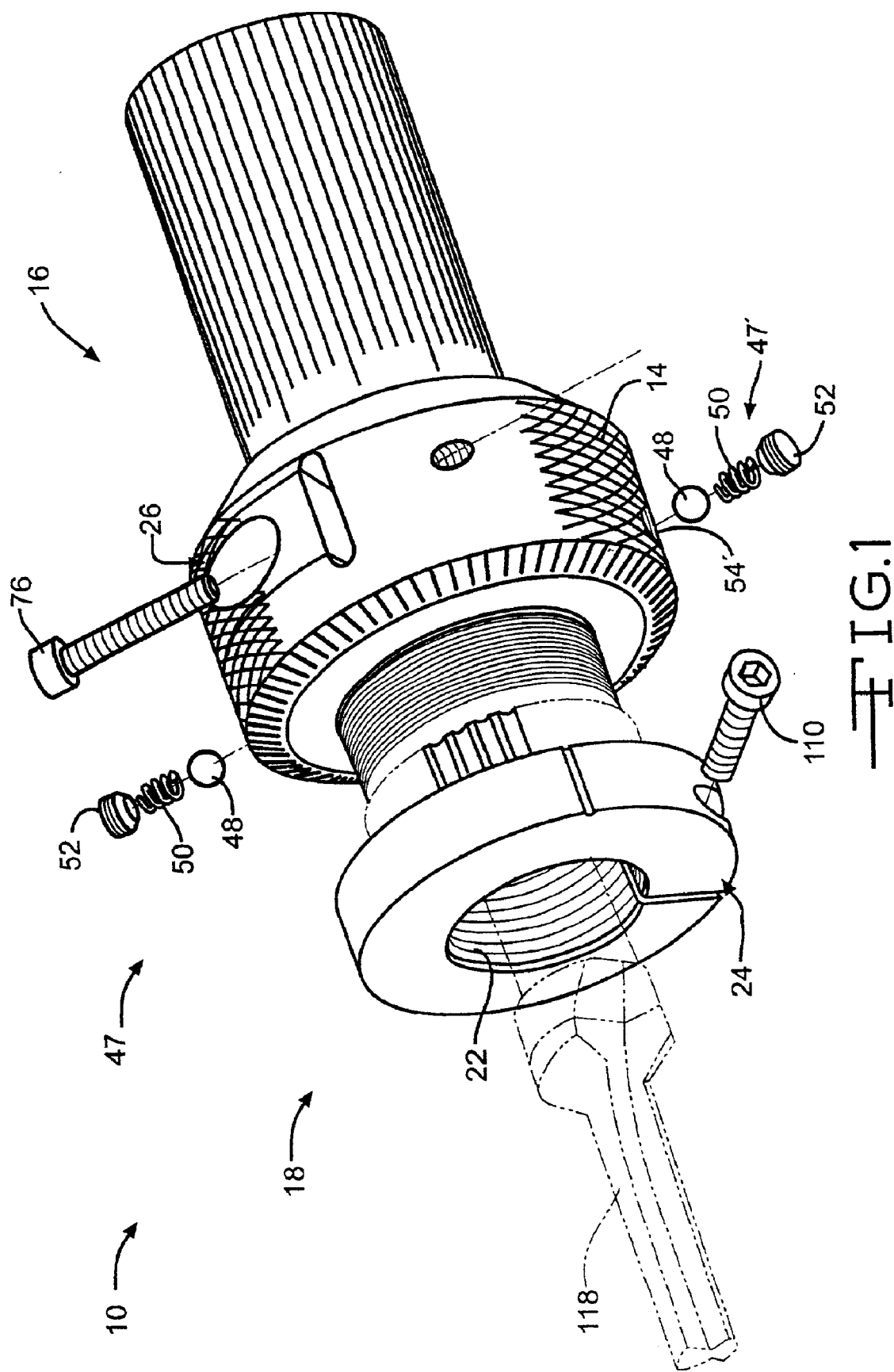
FIG. 1 is a partially exploded, perspective view of an adjustment device according to the invention.
Figure 15:
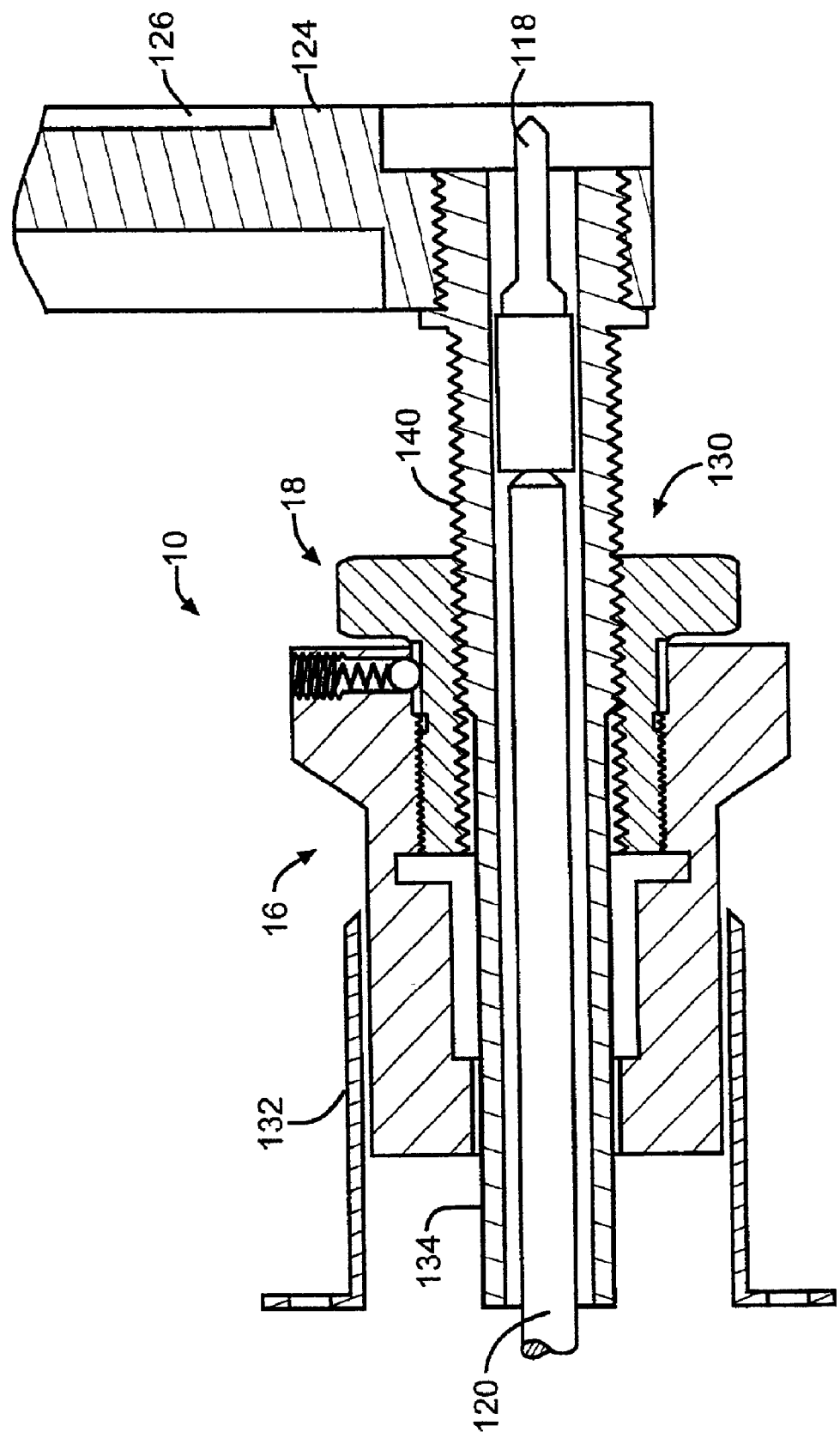
FIG. 15 is an environmental sectional view in elevation of the adjustment device according to the invention.

With reference now to FIG. 1, wherein like numerals designate like components throughout all of the several Figures, there is illustrated an adjustment device 10 adapted for use with a drill motor 116 (shown in FIG. 14). The device 10 preferably has a passage 12 through which the drill motor spindle 120 (also shown in FIG. 15) passes. This will become more apparent in the description of the operation of the adjustment device 10, as set forth hereinbelow.

According to a preferred embodiment of the invention, the device 10 comprises a first member, such as the fine adjustment sleeve 16 shown, and a second member, such as the coarse adjustment sleeve 18. The sleeves 16, 18 adjustably engage one another. The overall length of the adjustment device 10 can be varied by adjusting the sleeves 16, 18 relative to one another. The sleeves 16, 18 carry adjustment indicia to aid in making discrete adjustments in the length of the adjustment device 10. The sleeves 16, 18 can also be provided with a frictional surface, such as the knurled surface 14 shown, to aid in gripping the sleeves 16, 18 while adjusting the adjustment device 10.

The adjustment device 10 preferably has a slip fit member 20 (shown in FIG. 5) opposite or spaced apart from a threaded member 22 having a coarse pitch thread (e.g., a 20 pitch thread). As shown in the drawings, the slip fit member 20 is located at one end of the adjustment device 10 and the threaded member 22 at an opposite end. As will become more apparent in the description that follows, the slip fit member 20 supports one end of the adjustment device relative to either the drill motor 116 (shown in FIGS. 14 and 15) or the work piece (not shown) and the threaded member 22 is threadably adjustable relative to a mating thread carried by the other one of either the drill motor 116 or the work piece. This adjustment permits a distance or spatial relation between the drill motor 116 and work piece to be varied.

The slip-fit member 20 is preferably provided at a trailing end of the fine adjustment sleeve 16. The threaded member 22 is preferably provided at a leading end of the coarse adjustment sleeve 18. A leading end of the fine adjustment sleeve 16 is threaded to engage a trailing end of the coarse adjustment sleeve 18. The sleeves 16, 18 adjustably engage one another through this threaded engagement.

The adjustment device 10 according to a preferred embodiment of the invention is also provided with adjustment clamps 24, 26. A course adjustment clamp 24 is provided for clamping the threaded member 22 of the adjustment device 10 in a fixed position against the mating thread and relative to either the drill motor 116 or the work piece, which will become more apparent in the description that follows. A fine adjustment clamp 26 is provided for clamping the sleeves 16, 18 in a fixed relation to one another.

Now, with reference to FIGS. 2–8, the fine adjustment sleeve 16, according to the preferred embodiment of the invention, will be described in greater detail. As shown in FIG. 2, the fine adjustment sleeve 16 comprises a first portion and a second portion. The first portion is preferably defined by an elongate member 32. The portion member is preferably defined by an enlarged member 34. The elongate member 32 is preferably integral with the enlarged member 34 to form a sleeve of unitary construction.

The elongate member 32 is preferably a generally cylindrically shaped member that terminates at a butt end 36. The enlarged member 34 is a generally cylindrically shaped member that terminates at a face 38. The expression "generally cylindrical" means cylindrical or close to cylindrical but not exactly cylindrical to account for minor deviations. One or more transitional surfaces, such as the radial surface 40 and the taper 42 shown, may be provided between the elongate member 32 and the enlarged member 34. Transitional surfaces, such as the chamfer 44 shown, may also be provided between the enlarged member 34 and the face 38.

The elongate member 32 preferably carries coarse adjustment indicia, such as the coarse adjustment gradations 45, 45' shown in FIG. 2. The enlarged member 34 preferably carries fine adjustment indicia, such as the fine adjustment gradations 46 shown on the chamfer 44. The gradations 45, 45' and 46 are adapted to align with indicators 92, 142 to permit discrete amounts of adjustment in the adjustment device 10, which will become more apparent in the description of the operation of the adjustment device, as set forth hereinbelow. As clearly shown in drawings, every fifth coarse adjustment gradation 45' is distinguished from the other coarse adjustment gradations 45 to aid the user in making precise adjustments.

The enlarged member 34 is generally defined by two portions. A first portion defines the fine adjustment clamp 26 described above. The second portion is configured to support one or more arrangements, such as the spring ball arrangements, generally indicated at 47, 47', in FIG. 1. Each spring ball arrangement 47, 47' shown includes an engaging member, such as the ball 48 shown, a preload spring 50, and a preload setscrew 52. Each spring ball arrangement 47, 47' is supported in a radially extending bore 54, 54' (shown in FIG. 3) in the enlarged member 34. Each bore 54, 54' is threaded so that a setscrew can threadably engage the bore 54, 54' and confine a ball 48 and a spring 50 within the bore 54, 54'.

As shown in FIG. 5, the fine adjustment sleeve 16 defines a passage 56 through which the drill motor spindle 120 (shown in FIG. 15) may pass. Openings 58, 60 at each end of the fine adjustment sleeve 16 communicate with the passage 56.

One opening 58 is provided at the butt end 36 of the elongate member 32. This opening 58 is defined by the slip fit member 20, which is preferably adapted to receive a reduced diameter portion 134 of the drill motor spindle 120 (shown in FIG. 15), as will become more apparent in the description of the operation of the adjustment device 10, as set forth hereinbelow.

Another opening 60 is provided in the face 38 of the enlarged member 34. This opening 60 is provided for receiving a portion of the coarse adjustment sleeve 18. Immediately within the opening 60 is a cylindrical non-threaded portion 62 and further within the opening 60, beyond the non-threaded portion 62, is an internally threaded portion 64 having a fine pitch thread (e.g., a 40 pitch thread). The internally threaded portion 64 is radially aligned with the fine adjustment clamp 26. The non-threaded portion 62 is radially aligned with the threaded bores 54, 54' that support the spring ball arrangements 47, 47'.

As shown in FIG. 4, fine adjustment gradations 46 are spaced (at angle $\theta_1$) 5 degrees apart on the chamfer 44 of the enlarged member 34. The threaded bores 54, 54' are spaced (at angle $\theta_2$) apart 175 degrees apart, as shown in FIG. 3. Consequently, one of the threaded bore 54 is aligned axially with an even numbered gradation (e.g., 0 degrees) and the other threaded bore 54' is aligned axially with an odd numbered gradation (e.g., 175 degrees). It should be understood that this particular arrangement is provided for illustrative purposes, which will become more apparent in the description that follows, and that other configurations may be suitable for carrying out the invention.

The fine adjustment clamp 26 is defined by a cantilevered portion, generally indicated at 66, of the enlarged member 34, as clearly shown in FIGS. 6–8. The cantilevered portion 66 is bounded axially between two radially extending slots 68, 68' in the enlarged member 34 and radially by an axially extending slot 70. A counter bore 72 is provided in the cantilevered portion 66. The through bore 72 extends perpendicular relative to the axial slot 70. The through bore 72 aligns with a threaded bore 74 in the enlarged member 34, opposite the axial slot 70. A locking screw 76, such as the cap screw shown in FIG. 1, is inserted through the through bore 72 and threaded into the threaded bore 74. Upon tightening the locking screw 76, the cantilevered portion 66 is drawn towards a non-cantilevered portion 78 of the enlarged member 34, thus engaging the clamp 26.

Figure 10:
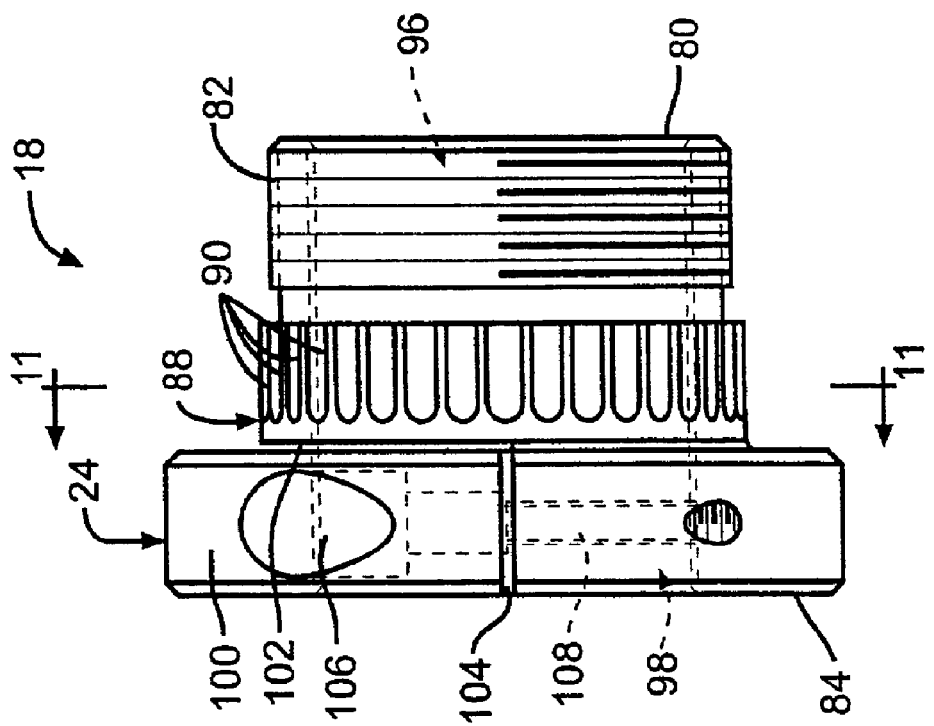
FIG. 10 is a plan view of the course adjustment sleeve shown in FIG. 9.
Figure 9:
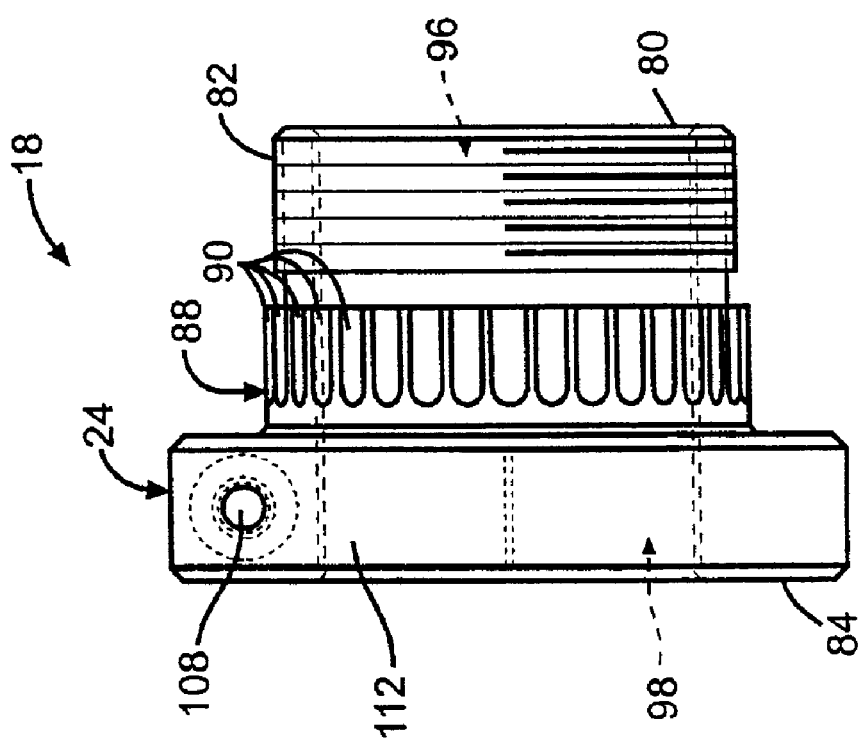
FIG. 9 is an enlarged side elevational view of a course adjustment sleeve of the adjustment device shown in FIG. 1.

Now, with reference to FIGS. 9–13, the course adjustment sleeve 18 will be described in greater detail. As shown in FIGS. 9 and 10, the coarse adjustment sleeve 18 comprises three portions. A first portion, which is located at a trailing end 80 of the coarse adjustment sleeve 18, defines an externally threaded member 82. A second portion, opposite the first portion, at a leading end 84 of the coarse adjustment sleeve 18, defines the coarse adjustment clamp 24, described above. A third portion, intermediate the first and second portions, defines a detent member 88 having circumferentially spaced fine adjustment detents 90.

The externally threaded member 82 of the coarse adjustment sleeve 18 mates with the internally threaded portion 64 of the fine adjustment sleeve 16. Upon threading the sleeves 16, 18 together, the detent member 88 of the coarse adjustment sleeve 18 is received within the non-threaded portion 62 of the fine adjustment sleeve 16. With the detent member 88 within the non-threaded portion 62, the balls 48 and preload springs 50 may be inserted in corresponding threaded bores 54, 54'. The setscrews 52 may be threaded into the bores 54, 54' to hold the balls 48 and springs 50 in the bores 54, 54'. In this assembled condition, the balls 48 and springs 50 are bounded between detent member 88 and the setscrews 52.

Figure 11:
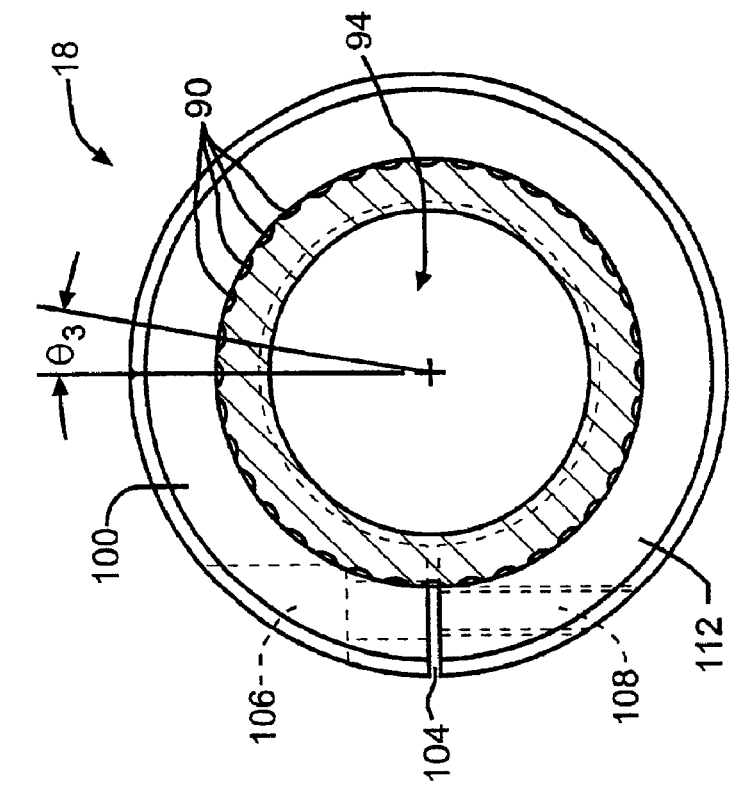
FIG. 11 is a sectional view of the course adjustment sleeve taken along line 11—11 in FIG. 10.

As shown in FIG. 11, the detents 90 are spaced (at angle $\theta_3$) 10 degrees apart. As stated above, the fine adjustment gradations 46 are spaced 5 degrees apart. Hence, there are twice as many fine adjustment gradations 46 as there are detents 90. Also, as stated above, the bores 54, 54' that support the spring ball arrangements 47, 47' are arranged so that one bore 54 aligns axially with an even numbered fine adjustment gradation (e.g., 0 degrees) and the other bore 54' aligns axially with an odd numbered fine adjustment gradation (e.g., 175 degrees). This arrangement allows only one of the spring ball arrangements 47, 47' to engage a detent 90 at a time. While one spring ball arrangement 47 engages a detent 90, the other spring ball arrangement 47' falls between two adjacent detents 90, and vice versa.

The engagement of a ball 48 with a detent 90 produces a physical click. The click provides an audible indication of a single increment of adjustment. This also produced an incremental physical resistance to movement of the sleeves 16, 18 relative to one another. Since the balls 48 engage the detents 90 independently, of one another, two clicks can be produced per detent 90. Each click represents a discrete amount of adjustment between the two sleeves 16, 18. Each discrete amount of adjustment is substantially equal. The expression "substantially equal" should be understood to mean equal and close to equal but not exactly equal due to minor deviations, such as deviations resulting from manufacturing tolerances.

To provide a visual indication of the incremental adjustment of the sleeves 16, 18, the fine adjustment gradations 46 are adapted to align with a fine adjustment indicator 92 (shown in FIGS. 12 and 13) carried by the course adjustment clamp 24. This provides a point of reference for making incremental adjustments.

Figure 12:
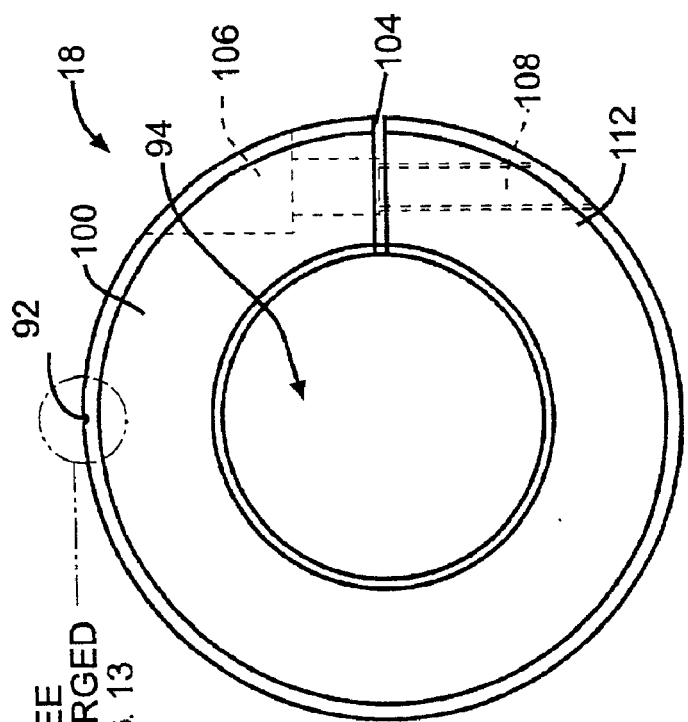
FIG. 12 is an end view of course adjustment sleeve shown in FIG. 10.
Figure 13:
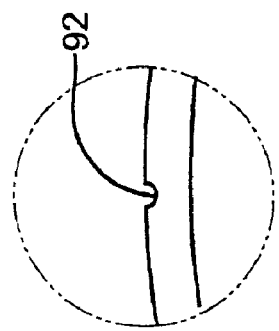
FIG. 13 is an enlarged view of fine adjustment indicator carried by the course adjustment sleeve shown in FIG. 9.

As shown in FIGS. 11 and 12, the course adjustment sleeve 18 defines a passage 94 through which the drill motor spindle 120 (shown in FIG. 15) may pass. Openings 96, 98 (shown in FIGS. 9 and 10) at each end of the course adjustment sleeve 18 communicate with the passage 94. One opening 96 is provided at the trailing end 80 of the course adjustment sleeve 18. Another opening 98 is provided at the leading end 84 of the course adjustment sleeve 18. The openings 96, 98 communicate with the threaded member 22 (shown in FIG. 1) of the adjustment device 10. As is clearly shown, the threaded member 22 of the adjustment device 10 is defined by the passage 94. The purpose of the threaded member 22 will become more apparent in the description that follows.

Similar to the fine adjustment clamp 26 set forth above, the coarse adjustment clamp 24 is defined by a cantilevered portion, generally indicated at 100, as clearly shown in FIGS. 9–12. The cantilevered portion 100 is bounded axially between the leading end 84 of the coarse adjustment sleeve 18 and a radially extending slot 102 (shown in FIG. 10) and radially by an axially extending slot 104 (shown in FIGS. 10–12). A counter bore 106 is provided in the cantilevered portion 100. The counter bore 106 extends perpendicular relative to the axial slot 104. The counter bore 106 aligns with a threaded bore 108 in the coarse adjustment clamp 24, opposite the axial slot 104. A locking screw 110, such as the cap screw shown in FIG. 1, is inserted through the counter bore 106 and threaded into the threaded bore 108. Upon tightening the locking screw 110, the cantilevered portion 100 is drawn towards a non-cantilevered portion 112 of the coarse adjustment clamp 24, thus engaging the clamp 24.

Now, with reference to FIG. 14, a detailed operation of the adjustment device 10 will be described. In operation, the adjustment device 10 is adapted for use with a self-colleting drill motor 116, such as the Q-MATIC MODEL 15SC drill motor, manufactured by QUACKENBUSH, a division of COOPER POWER TOOLS in Lexington, S.C., U.S.A. The invention is used in conjunction with the drill motor 116 to drill a hole in a work piece (not shown), such as an aircraft wing or panel, and more particularly, drill a hole in the work piece and a counter sink at the top of the hole.

The Q-MATIC MODEL 15SC drill motor is a handheld air-operated, positive feed drill motor. Each revolution of the drill motor advances the drill 118 (shown in FIGS. 1 and 15) a predetermined distance. The drill motor will automatically reverse when a hole having a pre-set depth is drilled. This produces a high quality hole by drilling at a fixed rate of feed with respect to rotation. This produces little or no burr when the drill 118 breaks through the work piece, even when drilling hard or exotic metals. Breakage of the drill 118 is reduced since there is no surge on break-through and the drill 118 stays sharp longer. To further insure that the drill 118 stays sharp longer, the drill motor 116 can be equipped with a mist lubricator, such as the lubricator 138 shown, for introducing coolant and air to the drill 118.

A jig collet foot 124 is preferably attached to drill motor 116. The collet foot 124 is used for drilling and counter-sinking hole layouts using a rigid tooling plate (not shown). The expression "collet foot", in this context, is intended to include any support or structure that supports the drill motor 116 relative to the work piece. The collet foot 124 has an elongated slot 126, through which extends a collet 128. The collet 128 is adapted to engage a predrilled hole (not shown) in a tooling plate on the work piece.

Upon operating the drill motor 116, the collet 128 expands in the predrilled hole and pulls the collet foot 124 tightly against the tooling plate while a hole is drilled in the work piece. The collet 128 is adapted to move within the slot 126 to vary the position of the drill motor 116 and, consequently, the drill 118 relative to the work piece. This permits a number of holes to be drilled in the work piece before moving the collet 128 to another predrilled hole.

The adjustment device 10 is adapted to fit on the drill motor 116 between two reference points, namely, the spindle 120 and the collet foot 124. In a preferred embodiment of the invention, a reduced diameter portion 134 at the leading end of the spindle housing 132 fits within the slip fit member 20 of the fine adjustment sleeve 16. A threaded portion 140 of the spindle housing 132 extending from the collet foot 124 threadably engages the threaded member 22 at the leading end 84 of the coarse adjustment sleeve 18.

The depth at which a hole is drilled is determined by the adjustment device 10. Upon operating the drill motor 116, the drill 118 is advanced through the adjustment device 10 to drill a hole into a work piece. The depth of the hole is determined by the adjustment device 10. To set up the adjustment device 10, a test hole is drilled and its depth is measured. If the depth of the hole exceeds 0.001 inch (0.00254 cm) the desired depth, the user should make a coarse adjustment.

To make a coarse adjustment, the user loosens the locking screw 110 of the coarse adjustment sleeve 18 and then turns the coarse adjustment sleeve 18 in either a clockwise or counterclockwise direction to either increase or decrease the travel of the drill 118 into the work piece. Upon turning the coarse adjustment sleeve 18, the threaded member 22 of the coarse adjustment sleeve 18 travels along threaded spindle housing 140 while the spindle 120, or a portion thereof, slips in the slip fit member 20 of the fine adjustment sleeve 16. It should be noted that the entire adjustment device 10 moves axially.

The spindle dust cover 132 of the drill motor 116 has a coarse adjustment indicator 142 that is adapted to align with the coarse adjustment gradations 45, 45'. Each gradation 45, 45' represents an incremental adjustment, such as 0.001 inches (0.00254 cm), in the travel of the drill 118. This incremental representation permits the user to make discrete coarse adjustments. Once a coarse adjustment is made, the locking screw 110 is tightened to lock the coarse adjustment sleeve 18 in place. The user can now drill another hole in the work piece and measure the depth of that hole. If the depth of that hole still exceeds 0.001 inch, the user can make further coarse adjustments until the depth of the hole is within 0.001 inch. The coarse adjustment gradations 45, 45' permit the user to quickly adjust the depth of the hole within 0.001 inch with very few coarse adjustments.

After making the necessary coarse adjustments, the user can make any necessary fine adjustments. This is accomplished by loosening the locking screw 76 of the fine adjustment sleeve 16 and rotating the sleeve 16. The fine adjustment indicator 92 on the coarse adjustment sleeve 18 is adapted to align with the fine adjustment gradations 46 on the fine adjustment sleeve 16. Each fine gradation 46 represents an incremental adjustment, such as 0.00035 inches (0.000889 cm), in the travel of the drill 118.

Each incremental adjustment is preferably represented by a click. The click functions as a tactile indicator and an audible indicator. The click also provides an incremental resistance to movement. A single click can be achieved by rotating the fine adjustment sleeve 16 from one gradation 45, 45' to the next. The click aids the user in accurately rotating the fine adjustment sleeve 16 a desired number of gradations. Once the fine adjustment is made, the locking screw 76 of the fine adjustment sleeve 16 is tightened to lock the fine adjustment sleeve 16 in place. Now, the user can drill another hole in the work piece and measure the depth of the hole to see if the depth of the hole is within acceptable tolerances. If not, further fine adjustments can be made. The fine adjustment gradations 45, 45' together with the tactile and audible indicators permit the user to quickly adjust the depth of the hole within acceptable tolerances with very few adjustments.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. An adjustment device adapted for use between a drill motor and a work piece, said adjustment device comprising:
    a first portion having a leading end and an internal surface, the internal surface including an internal thread having a first pitch; and
    a second portion having an outer surface and an inner surface, the outer surface including an external thread having a pitch substantially the same as the first pitch and the inner surface including an internal thread having a second pitch, wherein the first threaded pitch is different from the second threaded pitch;
    the outer surface of the second portion situated to threadedly engage the internal threaded leading end of the first portion, and the threaded inner surface of the second portion situated to threadedly engage a mating thread carried by either the drill motor or the work place, such that the overall length of the adjustment device may be adjusted by adjusting the first and second portion relative to one another.

2. In combination:
    a drill motor;
    a support for supporting said drill motor in spatial relation to a work piece; and
    an adjustment device comprising:
    a slip fit member;
    a threaded member spaced apart from said slip fit member, one of said slip fit member or said threaded member being engageable with said drill motor and the other one of said slip fit member or said threaded member being engageable with said support; and
    a clamp, said threaded member being threadably engageable with a mating thread, said clamp being adapted to clamp said threaded member in a fixed position against said mating thread, said adjustment device having an overall length that is adjustable to vary the spatial relation between said drill motor and said support.

3. An adjustment device adapted for use between a drill motor and a work piece, said adjustment device comprising:
    a first portion defining a slip fit member;
    a second portion defining a threaded member being threadedly engageable with a mating thread, wherein the first and second portions adjustably engage one another; and
    a clamp adapted to retain the threaded member in a fixed position against the mating thread;
    wherein the adjustment device having an overall length adapted so be adjusted by adjusting the first and second portions relative to one another, whereby the overall length is adapted to be adjusted to vary a distance between the drill motor and work piece.

4. In combination:
    a drill motor;
    a support for supporting said drill motor in spatial relation to a work piece; and
    an adjustment device comprising:
    a slip fit member defined by a first adjustment sleeve;
    a threaded member, defined by a second adjustment sleeve, spaced apart from said slip fit member, one of said slip fit member or said threaded member being engageable with said drill motor and the other one of said slip fit member or said threaded member being engageable with said support, said adjustment device having an overall length that is adjustable to vary the spatial relation between said drill motor and said support;
    a detent member included on one of said sleeves; and
    a member engageable with said detent member supported on the other of said sleeves, providing incremental resistance to movement of said sleeves relative to one another.

5. An adjustment device according to claim 1, wherein one of said first and second portions includes a clamp for clamping said first and second portions together to prevent said first and second portions from being adjusted relative to one another.

6. An adjustment device adapted for use between a drill motor and a work piece, said adjustment device comprising:
    a first portion; and
    a second portion, said first and second portions adjustably engaging one another, said adjustment device having an overall length that is adapted to be adjusted by adjusting said first and second portions relative to one another, whereby the overall length is adapted to be adjusted to vary a distance between the drill motor and the work piece;
    wherein one of said first and second portions includes a detent member and the other one of said first and second portions includes a member engageable with said detent member to provide incremental resistance to the adjustment of said first and second portions relative to one another.

7. An adjustment device according to claim 6, wherein said member that is engageable with said detent member is a spring-biased ball.

8. An adjustment device adapted for use between a drill motor and a work piece, said adjustment device comprising:

a slip fit member defined by a first portion; and a threaded member defined by a second portion opposite said slip fit member, said first and second portions adjustably engaging one another to vary the length of said adjustment device and vary a spatial relation between the drill motor and the work piece;

wherein one of said first and second portions includes a detent member and the other one of said first and second portions includes a member engageable with said detent member to provide incremental resistance to the adjustment of said first and second portions relative to one another.

9. An adjustment device according to claim 8, wherein said member that is engageable with said detent member is a spring-biased ball.

10. An adjustment device adapted for use between a drill motor and a work piece, said adjustment device comprising:

a slip fit member defined by a first portion; and a threaded member defined by a second portion opposite said slip fit member, said first and second portions adjustably engaging one another to vary the length of said adjustment device and vary the spatial relation between the drill motor and the work piece wherein one of said first and second portions includes a clamp for clamping said first and second portions together to prevent said first and second portions from being adjusted relative to one another.

11. In combination a drill motor;

a support for supporting said drill motor in spatial relation to a work piece; and an adjustment device comprising:

a slip fit member defined by a first adjustment sleeve;

a threaded member, defined by a second adjustment sleeve, spaced apart from said slip fit member, one of said slip fit member or said threaded member being engageable with said support, said adjustment device having an overall length that is adjustable to vary the spatial relation between said drill motor and said support; and a clamp included on one of said sleeves for clamping said sleeves together to prevent said sleeves from being adjusted relative to one another.

12. An adjustment device adapted for use between a drill motor and a work piece, said adjustment device comprising:

a slip fit member;

a threaded member opposite said slip fit member, said threaded member being threadably engageable with a mating thread; and a clamp being adapted to clamp said threaded member in a fixed position against said mating thread;

said adjustment device having an overall length that is adjustable to vary a spatial relation between the drill motor and work piece.

13. A combination according to claim 4, wherein said member that is engageable with said detent member is a spring-biased ball.

* * * * *